United States Patent
Johnson

(10) Patent No.: US 6,493,609 B2
(45) Date of Patent: Dec. 10, 2002

(54) AUTOMATIC FLIGHT ENVELOPE PROTECTION FOR UNINHABITED AIR VEHICLES

(75) Inventor: Timothy L. Johnson, Niskayuna, NY (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 09/844,863

(22) Filed: Apr. 27, 2001

(65) Prior Publication Data

US 2002/0161489 A1 Oct. 31, 2002

(51) Int. Cl.⁷ .................................................. G05D 1/08
(52) U.S. Cl. ............................... 701/3; 701/7; 701/10; 340/979
(58) Field of Search .................... 701/3, 7, 10; 340/979, 340/974; 244/213, 75 R, 90 A, 90 R

(56) References Cited

U.S. PATENT DOCUMENTS

| | | | | |
|---|---|---|---|---|
| 4,706,198 A | * | 11/1987 | Thurman | 701/120 |
| 5,001,646 A | * | 3/1991 | Caldwell et al. | 701/7 |
| 5,003,305 A | * | 3/1991 | Kelly et al. | 244/181 |
| 6,163,744 A | | 12/2000 | Onuken et al. | 701/3 |

OTHER PUBLICATIONS

Etkin, B. and Reid, L.D., "Dynamics of Flight Stability and Control" Third Edition, Ch. 4, p. 103–107.

Tomlin, C. et al., "Aerodynamic Envelope Protection using Hybrid Control" Proceedings of the American Control Conference, Philadelphia, Pennsylvania, Jun. 1998.

Howitt, J., "Carefree Handling for Super–Agility" American Helicopter Society Aeromechanics Specialist Conference, Fairfield County, CT, Oct. 11–13, 1995.

Horn, J. et al., "Flight Envelope Limiting Systems Using Neural Networks" American Institute of Aeronautics and Astronautics, 1998, p. 741–751.

SAE International, The Engineering Society for Advancing Mobility Land Sea Air and Space, Aerospace Recommended Practice for Flight Envelope Awareness/Protection, SAE ARP410/1, Issued 1993–06.

Rogers, R. "Pilot Authority and Aircraft Protections" Airworthiness Performance Evaluation and Certification Committee, Mar. 1, 1999.

Fernandez–Montesinos, M.A. et al., "Windshear Recovery Using Fuzzy Logic Guidance and Control" J. Guidance, vol. 22, No. 1: Engineering Notes, p. 178–180.

* cited by examiner

Primary Examiner—William A. Cuchlinski, Jr.
Assistant Examiner—Marthe Y. Marc-Coleman
(74) Attorney, Agent, or Firm—Scully, Scott, Murphy & Presser

(57) ABSTRACT

A method and system for automatic flight envelope protection to reduce damage and mishap rates of vehicles. The method and system generally include receiving a mission command from a mission management system that contains a predetermined flight mission; evaluating whether executing the command will maintain the vehicle within a flight envelope; modifying the command to one when executed will maintain the vehicle within the flight envelope, if otherwise; replanning and updating the mission pursuant to the command; sending the command to a flight control center; measuring the vehicle's state to determine if the command was executed as planned, and finally obtaining a next mission command.

42 Claims, 3 Drawing Sheets

AUTOMATIC FLIGHT ENVELOPE PROTECTION FOR UNINHABITED AIR VEHICLES

FIELD OF THE INVENTION

The present invention relates to the field of mission management systems of uninhabited air vehicles, and more particularly to a method and system for automatic flight envelope protection to reduce damage and mishap rates of such vehicles.

BACKGROUND OF THE INVENTION

Flight envelope protection is an extension of an aircraft guidance system that prevents the aircraft from exceeding its designed operating limits while in one of the aircraft's standard guidance modes. Modem flight envelope protection features offer automated or semi-automated safety features. In manned aircraft, flight envelope protection is accomplished by the pilot, together with automated systems, using visual, auditory, tactile warning aids, and pilot controls.

On-ground sensing, usually provided by squat switches, is used to prevent inadvertent activation of ground spoilers and engine reverse thrust. Stall protection systems are used to warn of stalls and prevent stalls from happening. Digital engine controls provide engine protections such as thrust controls and reverse thrust controls.

These features are designed for the protection of the vehicle and its passengers and are used to prevent the vehicle from exceeding its structural and aerodynamic limitations. Exceeding a vehicle's limitations may lead to damage or complete destruction of the vehicle, termed a mishap.

Hard protections prevent the pilot from exceeding the flight envelope. Soft protection systems incorporate soft limits that warn pilots of pending or actual envelope exceedance, but allow the pilot to override the limitations.

With uninhabited (unmanned) aircraft, protection must be achieved automatically without intervention from a ground controller or other outside agent. Existing flight envelope protection systems for manned aircraft alert the pilot, who then must assess the situation and determine what action to take. In the uninhabited aircraft, to achieve automatic flight envelope protection, the method and system must not only be capable of detecting the conditions for alerting, but also determine appropriate corrective actions. This requires sensor signal logic (to replace the pilot's biosensory cues), and control logic, which are capable of overriding other commands (e.g., waypoint navigation) to the aircraft guidance or navigation systems whenever the aircraft enters a guidance condition which is not maintainable.

Automatic flight envelope protection may be realized as additional software on an existing guidance and navigation processor, or as a separate mission management processor and/or additional sensors and mechanical actuation devices for the aircraft. The main benefit of such protection is to reduce damage and mishap rates of unmanned vehicles by providing designed-in prevention of unsafe or unstable speeds and attitudes from which the vehicle cannot recover.

Some manned aircraft have extensions of the navigation system for route planning purposes, or have the mission plan or flight plan data entered and stored before initiation of a mission. However, manned aircraft do not usually have onboard planning. Uninhabited aircraft either have ground-based control stations (which, among other things, might transmit preplanned mission data), or mission planning systems (normally on board) which control the execution of the aircraft's mission.

Presently available mission planning systems for generating guidance or navigation commands for a vehicle (whether it is a ground-based controller, preprogrammed operating sequence, or mission management system) may at times generate commands which the vehicle cannot safely execute. These subsystems are designed prior to flight, and typically use simplified, fleet-wide models of aircraft performance—hence they will occasionally issue commands that a particular vehicle cannot execute.

For efficiency reasons, users implement fleet-wide envelope protection protocols. These govern all types of vehicles within a fleet. However, certain vehicles require different commands to remain within their flight envelopes. Each vehicle type usually has its own flight envelope. In addition, under various unanticipated flight conditions, mission planning systems may produce completely erroneous outputs for short periods of time. If these commands are simply executed by the guidance, navigation, or control systems they often result in damage to the vehicle or a mishap.

Some proposed flight envelope protection systems utilize neural networks that have been trained from large sets of known input values. However, these systems cannot detect or respond properly to extreme flight conditions where neither simulated nor measured flight data are likely to be accurate.

Existing methods of flight envelope protection, which involve the addition or modification of logic hardware in the mission management, guidance and navigation systems, avionics, or primary flight control systems, are not yet fully developed for uninhabited air vehicles, are not sufficiently adaptable to conditions of actual flight, and do not incorporate an integrated systems approach that is capable of balancing vehicle safety with mission objectives under all circumstances. The prior art suffers from:

limitations and faults of the mission management system and the software which supports it;

lack of a consistent definition of the flight envelope;

not linking the flight envelope parameterization to the guidance modes of the system;

not detecting when the flight envelope is about to be exceeded;

inadequately defining a corrective action, due to dependence on the availability of input from a pilot; and, poor integration with existing mission management, guidance navigation, and flight control systems.

SUMMARY OF THE INVENTION

Automatic Flight Envelope Protection (AFEP) is embodied in software and computational hardware which augments existing guidance, navigation and/or control systems of Uninhabited Air Vehicles (UAV's) (also termed Unmanned, or Autonomous Air Vehicles). These include but are not limited to Cruise missiles, Unmanned Reconnaissance Vehicles (URV's), or Remotely Piloted Vehicles (RPV's). The invention automatically prevents UAV's from flying outside of their safe operating limits when they are subject to guidance commands generated by on-board mission planning systems or ground-based control systems.

The embodiments of the invention involve means of defining the flight envelope that are specifically suited to UAV'S, means of anticipating and detecting actual or expected exceedance of the flight envelope and means of generating corrective actions which maintain the vehicle within the envelope, while maintaining vehicle controllability and awareness of UAV mission objectives. In addition, this invention includes new means of integrating these features into a system which is interoperable with conventional aircraft guidance, navigation, control, propulsion, and avionic subsystems.

The invention is a novel mission execution system that is capable of dynamically switching between levels: mission planner/ navigation/ guidance/ flight control. The approach is "memory-less" in that it detects and corrects problems with immediate operating conditions and guidance commands, but relies on existing "memory" of the status of other subsystems (guidance, flight control) to store state information about the system.

The flight envelope protection algorithms are the lowest level of the vehicle management system, and their corrective actions are inserted between the navigation system 20 and the guidance or flight control system 30. When the current operating point of the aircraft approaches the flight envelope too closely, or from the wrong direction, corrective actions will override or modify the navigation system inputs to the guidance system or the normal guidance system 20 inputs to the primary flight control system 30. The invention retains intact the primary flight control functions, which are usually already designed for safety in the event of equipment failures (but not for other types of mishap prevention).

The AFEP algorithms accept inputs from air data to determine the current operating point within the flight envelope, from the guidance system 20 primarily the guidance mode and heading command, and from the mission planning system 40 to determine corrective actions which are most compatible with mission parameters, viz., tactical objectives. The flight envelope and current operating point are updated dynamically based on current air and vehicle data.

The algorithms dynamically determine the most critical distance of the current operating point from the boundary of the flight envelope, and the normal (approach) component of speed, and then compute corrective actions consistent with these parameters. This is preferably done by a "bounding polytope" method.

The algorithms use the "virtual actuator" (Aerodynamic Control Effector, or ACE) concept to allocate force among available physical actuators. The invention also uses aerodynamic control effectors to simplify the choice of actuators to implement control actions. The advantage of this approach is that ACE systems automatically adopt effective actuator forces and operative limits in the event of equipment failure or battle damage, so that no additional changes are required in the AFEP system. In the event that an ACE system is not available, the AFEP system can be designed to operate with a fixed set of physical actuators.

The AFEP algorithm contains hybrid logic that selects the corrective action based on the guidance mode of the aircraft, if any.

AFEP is intended to reduce damage and mishap rates of such vehicles, particularly when they are subject to guidance commands that would otherwise cause the vehicle to become uncontrollable and/or to exceed other operating limits which would cause permanent damage or destruction to the vehicle or its components. The AFEP concept is typically executed onboard the aircraft rather than on the ground. A concomitant benefit is the improvement in mission success rates and UAV availability, since mission success normally requires vehicles to remain operational. Another benefit is to improve the safety of other (manned or unmanned) vehicles which must interoperate with UAV's in commercial or military airspace.

DETAILED DESCRIPTION OF THE INVENTION

Figure 1:
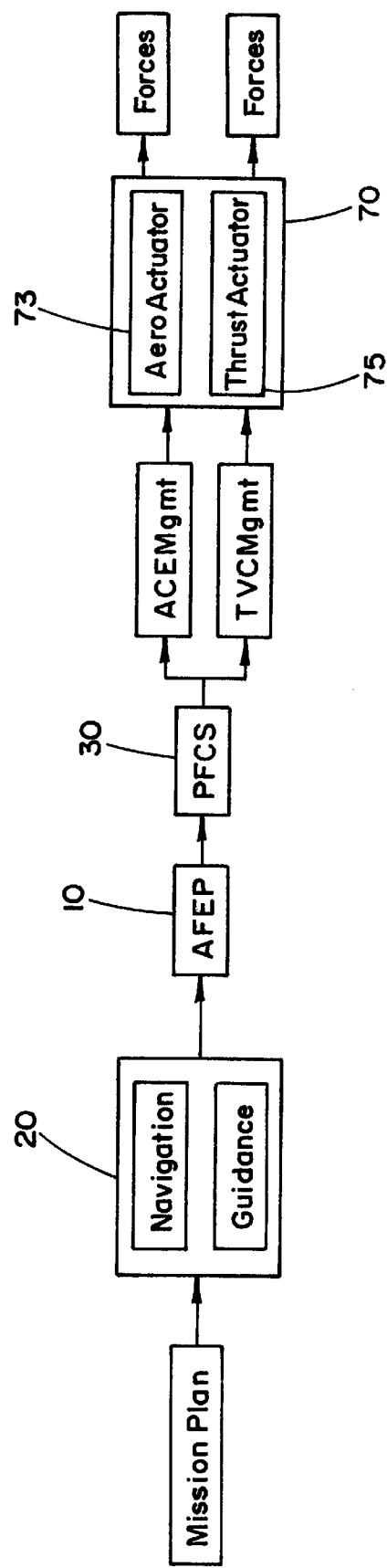
FIG. 1 is a logical representation of UAV Onboard Signal Processing, showing the addition of AFEP blocks.

The invention is embodied in the mission management, guidance, navigation, control (GNC) and avionics systems architecture of the unmanned air vehicle. The relationship of the AFEP system to the other existing subsystems is shown in FIG. 1. The invention incorporates executable computer programs, and may also include a separate processor unit (CPU) upon which this code is executed, additional sensor interfaces, and/or interfaces to various aircraft subsystems.

In some embodiments, these elements might be implemented as separate hardware components or as extensions to existing computing, sensor, or vehicle control subsystems. Otherwise, FIG. 1 may be interpreted as a software process block diagram. How those elements are implemented depends on the particular vehicle. If the vehicle has an adaptable processing unit the invention need only extend its abilities, if the vehicle does not have adequate sensing devices, the invention would incorporate the required sensors. Regardless of how they are implemented, however, the interfaces in FIG. 1 are significant to the invention in the following sense:

(1) The AFEP unit 10 is logically interposed between the navigation and guidance system 20 and the flight control system 30.

(2) The AFEP unit 10 receives inputs from the mission planner 40, from the vehicle avionics subsystem 23; it may receive inputs from additional sensor or payload subsystems 27.

(3) The AFEP unit 10 produces outputs to the flight control system 30 or override switch 21 and (if it is present) to the mission management system 40.

In varying embodiments, these subsystems may be merged, or may be absent, or may be implemented via a ground data link and pilot-in-the-loop, without affecting the fundamental signal flow shown in FIG. 1.

Figure 2:
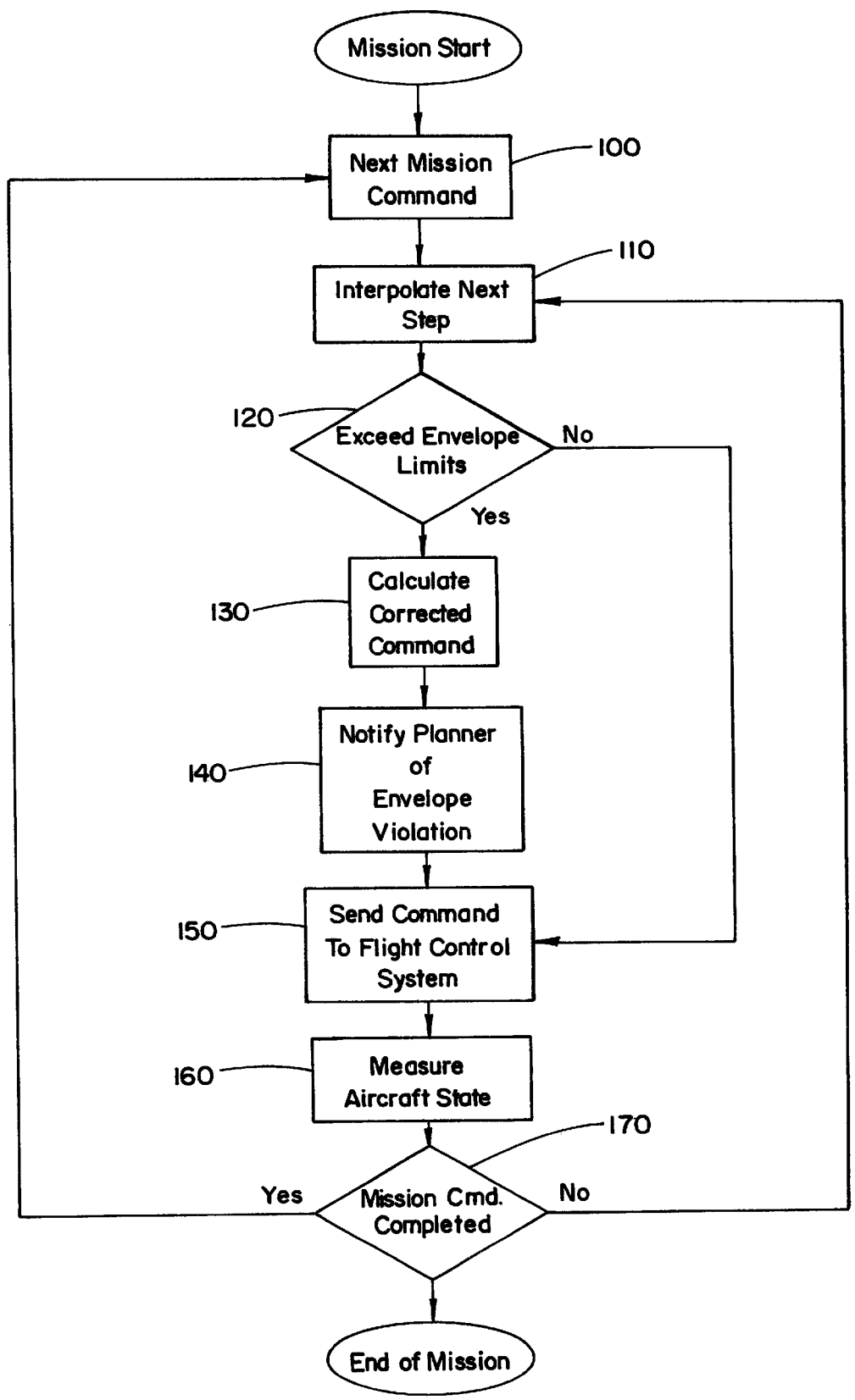
FIG. 2 is a flow chart representing the processing steps within the AFEP block.

The top-level logic of the flight envelope protection software is shown in FIG. 2. The steps in this logic are now described:

Next Mission Command 100—A waypoint or mission command is obtained from the mission management system 40. Without AFEP, this command (possibly after some preliminary calculations) is fed directly to the navigation 20 and/or guidance 25 system to be executed. With AFEP, this command is pre-evaluated to determine whether it is within the flight envelope of the vehicle, and is overridden 21 by an achievable command from the AFEP system if this is not the case. This modification of the data path includes the fact that this system examines one command in advance of the command currently executed.

Interpolate Next Step 110—Normally, a mission level command will require path interpolation, which is often done partly or completely by the navigation system 20. If not, then this function needs to be performed in the AFEP system; if so, then the AFEP system needs to obtain incremental waypoint outputs from the navigation system 20.

Exceed Envelope Limits 120 (decisions)—The next interpolated step is evaluated to determine whether it exceeds envelope limits. These limits may include the consideration of both vehicle and earth-centered coordinates, and generally require dynamic updates based on vehicle avionics sensor 23 inputs to the AFEP system 10 (as indicated in the higher level diagram in FIG. 1). If limits are exceeded, the AFEP logic (see subsequent steps) is invoked; if not, then the original mission plan is executed (by issuing the planned command to the guidance system), and this test is re-applied at the next interpolated step of the flight plan. Each mission command is pre-tested before it is issued, and the flight envelope limits are calculated on-line.

Calculate corrected command 130—In this step the originally planned command is modified so that the flight envelope will not be exceeded. In the most typical case of a gradual exceedance of the envelope, the command will be corrected in such a way as to move along the flight envelope in the direction of the original command, as projected onto the surface of the envelope (more complex logic being used when multiple surfaces, such as corners, are approached). In the case of an interruption or discontinuity in the command sequence, a replan will be sought and limit protection will be based on recent command history prior to the anomaly. This step calculates corrected commands that achieve short term envelope avoidance.

Notify planner of Envelope Violation 140—The mission planning software is notified of envelope violations, since these may have long term implications for the mission plan. In one embodiment, the invention uses available online (viz., either on-board, or ground station based) replanning methods if these are available. If so, the replanner will compute a modification of the long term mission plan and update the current mission plan. Thus, this step corrects for long term implications of unintended flight envelope penetration, which cannot be resolved without consideration of the entire mission objectives and resource availability. In the event that a replanner is not available, the method continues to seek the best approximation, within the operating envelope capabilities of the aircraft, to the original plan.

Send Command to Flight Control System 150—The new command (with or without correction) is issued to the flight control system 30. Although this represents the normal command pathway, it may be viewed as novel within the current context, because of the fact that the flight envelope corrections do not require modifications to the normal Flight Control System. In the present case, very short term errors are corrected by the action of the flight control system itself.

Measure Aircraft State 160—The aircraft state is measured to determine that the command is being executed as planned. This step is standard, and is often performed within the control system.

Mission command Completed 170 (decision)—The mission command is evaluated vs. plan to determine whether the plan is being executed correctly. If not, the envelope limiting cycle will be initiated once again.

The steps "exceed envelope limits", "calculate corrected command", and "measure aircraft state" are now described in greater detail.

Exceed Envelope Limits Logic

The concept of "flight envelope" is normally applied to situations where some subset of the generalized coordinates of the vehicle (normally, either position or momentum variables) are held at (quasi) static values, and one considers "points" in position momentum space which are operationally feasible. One can consider all possible constant settings of any subset of actuators 70, and represent all (six) generalized position and (six) generalized momentum (or velocity) coordinates of the vehicle. Normally, a primary flight control system (PFCS) 30 loop is required for these flight conditions to be stable in the sense that the derivatives of some combination of position or momentum variables are constant; normally, the PFCS 30 itself has modes, and one can consider that these might be further employed. Aside from modifying dynamics, the effect of a PFCS 30 is to provide static (as well as dynamic) coupling of certain control variables, which has the effect of constraining the effective flight envelope, so that the new inputs to the PFCS 30 replace the original inputs to individual actuators 73, 75. This can be modeled as follows:

$$\dot{x}_E = u^E \cos\theta \cos\psi + v^E (\sin\phi \sin\theta \cos\psi - \cos\phi \sin\psi) + w^E (\cos\phi \sin\theta \cos\psi + \sin\phi \cos\psi)$$

$$\dot{y}_E = u^E \cos\theta \sin\psi + v^E (\sin\phi \sin\theta \sin\psi + \cos\phi \cos\psi) + w^E (\cos\phi \sin\theta \sin\psi - \sin\phi \cos\psi)$$

$$\dot{z}_E = -u^E \sin\theta + v^E \sin\phi \cos\theta + w^E \cos\phi \cos\theta$$

$$\dot{\phi} = p + (q\sin\phi + r\cos\phi)\tan\theta$$

$$\dot{\theta} = q(\cos\phi - r\sin\phi)$$

$$\dot{\psi} = (q\sin\phi + r\cos\phi)\sec\theta$$

where for wind $W$, $$u^E = u + W_x; v^E = v + W_y; w_E = w + W_z \qquad (1)$$

are the generalized position equations (1), and the generalized momentum equations (2) are:

$$X - mg\sin\theta = m(\dot{u}^E + qw^E - rv^E)$$

$$Y + mg\cos\theta\sin\phi = m(\dot{v}^E + ru^E - pw^E)$$

$$Z + mg\cos\theta\cos\phi = m(\dot{w}^E + pv^E - qu^E)$$

$$L = I_x\dot{p} - I_{zx}\dot{r} + qr(I_z - I_y) - I_{zx}pq + qh'_z - rh'_y$$

$$M = I_y\dot{q}rp(I_x - I_z) + I_{zx}(p^2 + r^2) + h'_x - ph'_z$$

$$N = I_z\dot{r} - I_{zx}\dot{p} + pq(I_y - I_x) + I_{zx}qr + ph'_y - qh'_x \qquad (2)$$

where $h' = [h'_x, h'_y, h'_z]$ are the components of the net rotor inertias relative to the body frame of the aircraft and are assumed to be constant or slowly varying with respect to time. In these equations [X, Y, Z] and [L, M, N] are the aerodynamic forces and moments which include the control forces and moments. The net result of the feedback laws in the form (3), where error and measurement noise terms have not been explicitly shown are:

$$\vec{F} = [X,Y,Z,L,M,N]' = \vec{F}(x_E, y_E, z_E, u^E, v^E, w^E, \phi, \theta, \psi, p, q, r, \bar{u}, \bar{v}, \bar{w}, \bar{p}, \bar{q}, \bar{r}) \qquad (3)$$

In this example, the commanded velocity and angular rates are shown by overbars (in other autopilot configurations, attitude and altitude may also be controlled). One expression of the flight envelope is obtained by setting the time derivatives in (1), (2), subject to (3), equal to zero. The flight envelope can be derived from the vector set of equations (4):

$$\vec{G} = [\dot{u}^E, \dot{v}^E, \dot{w}^E, \dot{p}, \dot{q}, \dot{r}]' = 0 \qquad (4)$$

by solving for the actual steady rates (u, v, w, p, q, r) in terms of the commanded velocity and angular rates, and then finding the envelope of all solutions of (u, v, w, p, q, r) as the commanded variables are varied (noting that at several extremes of the flight envelope, the actual steady rates will not be equal to the commanded steady rates due to nonlinearities in the aerodynamic terms, and due to the limits in the ranges of the commanded variables).

For every point on the flight envelope there exists at least one set of extreme PFCS inputs and/or modes which holds that point in steady flight. An alternative view is that if the vehicle is in steady flight at a particular point in the flight envelope, then an inversion of the dynamic map of the aircraft (with the PFCS in place, if appropriate) can be used to evaluate whether a commanded change in position or orientation is within the marginal control authority that is available at the current operating point. In other words, the inversion map shows the changes in controls required in order to achieve a commanded change in position or orientation. The commanded change is within the flight envelope if the changes in all controls are within their admissible ranges of motion (and/or motion rates).

The V-N envelope is normally derived by assuming that there is a longitudinal axis control system, and that the roll and yaw commands (and actual steady rates) are set to zero. It expresses the relationship of vertical force ($m\dot{w}^E$) and actual forward speed (u), as a function of the implicit variables commanded climb rate ($\overline{w}$) and forward speed ($\overline{u}$). The V-H envelope is also derived for the longitudinal axis control problem, but for the case of an altitude hold condition (commanded $z_E$). In this mode, the controller controls altitude (z) while holding altitude rate (w) to zero.

The online computation of an inverse mapping could be demanding, therefore an alternative embodiment, is as follows:

(a) An inner approximation of the flight envelope (in any number of dimensions, to any specified degree of accuracy) can be obtained as the intersection of half-spaces. Each half-space can be specified by a normal vector and distance from the origin of the envelope coordinates (5).

$$\vec{n} \cdot \vec{e} \geq d_i, \forall i=1, \ldots N \quad (5)$$

where $n_i$ is the normal vector to the I-th face of the flight envelope, e is a vector from the origin to a test point in the plane of the flight envelope, and N is the number of faces of the flight envelope (with higher N providing greater accuracy); $d_i$ is the distance of the ith face of the approximating region from the origin in the coordinates of the flight envelope.

(b) The current operating point (which is estimated from air data and other onboard sensors) can be also represented as a vector. By taking the inner product of this vector with each of the normal vectors, and subtracting it from the distance of the envelope, one can tell from the set of signs of all of these quantities whether the operating point is inside or outside of the flight envelope, and in fact can determine the distance to the nearest face of the polytope approximation of the flight envelope, as well as which face it is on.

$$s_i = \text{sgn}(\vec{n}_i \cdot \vec{e} - d_i); \delta i_i = |\vec{n}_i \cdot \vec{e} - d_i| \quad (6)$$

(c) The distance from the flight envelope and if appropriate, speed of motion of the operating point toward the nearest boundary can be used to determine to a first approximation whether corrective action is required.

Calculate Corrected Command Logic (d) If corrective action is required, the duration, direction and magnitude of thrust required for envelope avoidance (e.g., within a specified time) can be calculated. Normally, the corrective thrust will be applied in a direction that is normal to the closest face of the flight envelope. Using the Aerodynamic Control Effector ("ACE") concept, actuators can be chosen in such a way that the desired force can be applied. At this time, the mission management system 40 is notified that the flight envelope boundary is near to the operating point, so that re-planning may occur. The definition of the particular boundary also may include which face of the envelope is being approached.

(e) Constant offsets are applied to the inputs of the PFCS 30 for the desired period of time. Monitoring of the operating point continues according to (a)–(d). During this time, mission re-planning should occur, so that the envelope is avoided; alternatively, the mission management system 40 may issue an "override" command to disable the flight envelope protection algorithm if an excursion from the flight envelope is considered to be necessary for vehicle survival.

(f) Control offset action ceases when the operating point is again within safe distance of the flight envelope. This may occur due to the shift of the operating point from the correction applied in (e), from a change in the mission command, or due to vehicle or atmospheric changes. It is possible that the operating point will now exhibit "chattering" or "sliding" in the plane of the (nearest hyperplane inner approximation to the) flight envelope boundary; this is not an error, but should be expected under certain conditions. This sliding motion will continue until the operating point finds a (possibly local) minimum which is least inconsistent with the mission command inputs; in some cases, it is possible that a slowly osculating pattern of motion of the operating point on one or more hyperplanes just inside the flight envelope boundary will be encountered. These should be viewed as normal occurrences which are consistent with, and in fact, required by, the nature of the flight envelope protection problem. During this motion, the mission planning algorithm will be repeatedly notified of the proximity of the operating point to the boundary.

(g) When flight envelope protection action is no longer required, the offsets to the PFCS 30 are removed by deactivating the override logic 21, and return to normal flight is automatic. The proposed flight envelope protection algorithm leaves the PFCS 30 inner loop algorithms and limit protections in place, and does not introduce any additional short term dynamics (e.g., delays or integral action) into the system. Therefore, the PFCS 30 continues to operate as designed throughout the flight envelope protection intervention. Since the magnitude of the offset actions is continuously "phased in" near the boundary, the PFCS 30 is not subjected to any large disturbances. Since an "inner" polytope approximation of the flight envelope is used, there remains a small amount of residual control authority available to the PFCS 30 as the boundary is approached; the ACE (equivalent effector) approach will automatically select the most effective combinations of control surfaces to achieve the boundary avoidance. Finally, if the vehicle slightly exceeds the flight envelope (e.g., due to a gust or transient dynamics), the flight envelope protection algorithm will continue to act in a consistent manner to return it to the nearest point inside the boundary.

Figure 3:
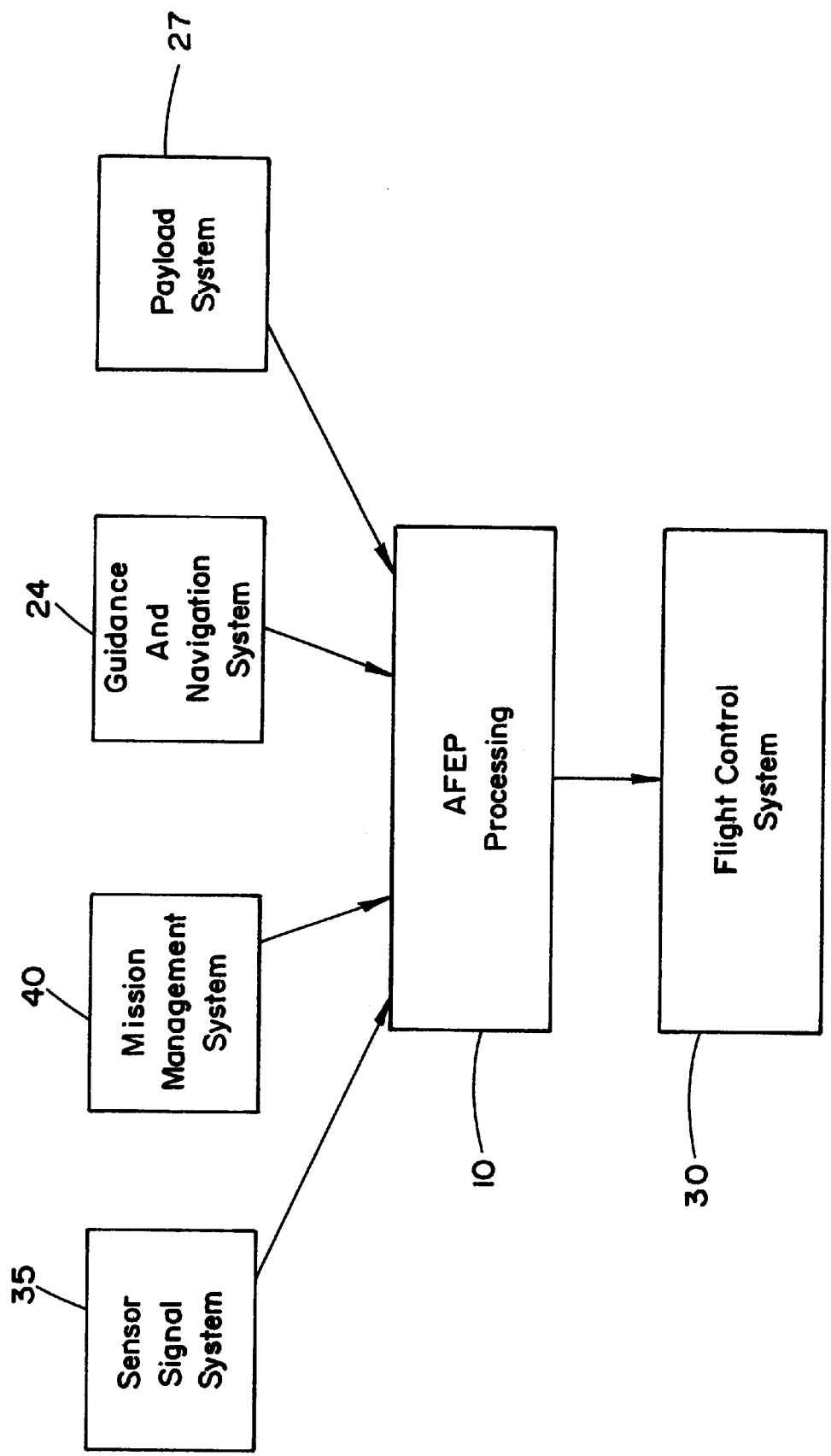
FIG. 3 is a functional chart representing the processing steps for flight envelope protection for UAVs.

FIG. 3 depicts the data flow of the processing steps for flight envelope protection. The AFEP 10 receives feedback states from a sensor signal system 35, a mission management system 40 and a guidance and navigation system 24 and sometimes a payload system 27. The AFEP 10 calculates, a control command signal from these feedback and command signal inputs to determine if the vehicle is approaching its flight envelope. Any control signals that fall outside the flight envelope are modified appropriately to fall within the flight envelope. All signals conforming to the flight envelope are transmitted to the primary flight control system 30 which executes the mission commands.

Accordingly, it should be readily appreciated that the method and system for automatic flight envelope protection to reduce damage and mishap rates of uninhabited vehicles of the present invention has many practical applications. This invention may be applied to unmanned vehicles, cruise missiles, and remotely piloted vehicles as well as other types of vehicles. Additionally, although the preferred embodiment has been illustrated and described, it will be obvious to those skilled in the art that various modifications can be made without departing from the spirit and scope of this invention. Such modifications are to be considered as included in the following claims unless the claims expressly recite differently.

What is claimed is:

1. A method for automatic flight envelope protection for uninhabited air vehicles comprising:
    repeating the following operations until a mission is completed:
        a) obtain a mission command from a mission management system that contains a predetermined flight mission;
        b) evaluate whether executing the command will maintain the vehicle within a flight envelope;
        c) modify the command not within the flight envelope to one within the flight envelope;
        d) send the command to a flight control system and execute the command;
        e) measure vehicle's state to determine if the command was executed as planned; and
        f) obtain a next mission command.

2. A method for automatic flight envelope protection as in claim 1 wherein:
    the operations (b)–(e) may be dynamically changed in chronology.

3. A method for automatic flight envelope protection as in claim 1 wherein:
    the flight envelope is dynamically calculated on-line.

4. A method for automatic flight envelope protection as in claim 3 further comprising:
    overriding a modified command to enable the execution of a command leading to an excursion from the flight envelope.

5. A method for automatic flight envelope protection as in claim 3 further comprising:
    replanning and updating the mission pursuant to the modified command.

6. A method for automatic flight envelope protection as in claim 5 wherein:
    replanning and updating of the mission is done dynamically on-line.

7. A method for automatic flight envelope protection as in claim 6 wherein:
    replanning of the mission dynamically computes modifications of the long term mission plan and updating the mission dynamically modifies a current mission plan.

8. A method for automatic flight envelope protection as in claim 3 wherein:
    the best approximation, within the operating envelope capabilities of the aircraft, to the original mission plan is calculated and followed.

9. A method for automatic flight envelope protection as in claim 3 wherein:
    the flight envelope is dynamically calculated using a bounded polytope approximation.

10. A method for automatic flight envelope protection as in claim 3 wherein:
    the flight envelope is calculated from vehicle and earth-centered coordinates and vehicle avionics sensor inputs.

11. A method for automatic flight envelope protection as in claim 3 wherein:
    the on-line calculation of the flight envelope uses stored parameter values to generate a continuum of possible changes to the flight envelope.

12. A method for automatic flight envelope protection as in claim 3 wherein:
    the operations rely on existing memory of subsystems for storing state information.

13. A method for providing automatic flight envelope protection for uninhabited air vehicles comprising:
    receiving a mission command from a mission management system;
    evaluating whether executing the command will maintain the vehicle within a flight envelope and modify the command to one which will maintain the vehicle within the flight envelope if the vehicle is not;
    sending the command to a flight control center;
    measuring vehicle's state to determine if the command was executed as planned; and
    obtaining a next mission command.

14. A method for providing automatic flight envelope protection as in claim 13 wherein:
    the flight envelope is dynamically calculated on-line.

15. A method for providing automatic flight envelope protection as in claim 14 further comprising:
    overriding a modified command to enable the execution of a command leading to an excursion from the flight envelope.

16. A method for providing automatic flight envelope protection as in claim 14 further comprising:
    replacing and updating the mission pursuant to the command.

17. A method for providing automatic flight envelope protection as in claim 14 wherein:
    the flight envelope is dynamically calculated using a bounded polytope approximation.

18. A method for providing automatic flight envelope protection as in claim 14 wherein:
    evaluating whether executing the command will maintain the vehicle within a flight envelope includes consideration of vehicle and earth centered coordinates and vehicle avionics sensor inputs.

19. A method for providing automatic flight envelope protection as in claim 14 wherein:
    replanning and updating the mission is done dynamically.

20. A method for providing automatic flight envelope protection as in claim 19 wherein:

the replanning of the mission dynamically computes modifications of the long term mission plan and updating dynamically modifies a current mission plan.

21. A method for providing automatic flight envelope protection as in claim 14 wherein:

the on-line calculation of the flight envelope uses stored parameter values to generate a continuum of possible change to the flight envelope.

22. A method for providing automatic flight envelope protection as in claim 14 wherein:

state information is stored on existing memory of subsystems.

23. A method for providing automatic flight envelope protection for uninhabited air vehicles comprising:

receiving feedback states from a sensor signal logic system at a logical controller;

receiving command signals from a mission management system which contains a mission at the controller;

receiving command signals from a guidance and navigation system at the controller;

calculating, by the controller, a control signal from the feedback and command signal inputs to determine if the vehicle is approaching a flight envelope;

insuring the vehicle does not exceed operating limits by conforming the control signal with operating limits of the vehicle; and transmitting the conforming signals to a flight control system.

24. A method for providing automatic flight envelope protection as in claim 23 further comprising:

receiving command signals from payload subsystems at the logical controller.

25. A method for providing automatic flight envelope protection as in claim 23 further comprising:

replanning and updating the mission pursuant to the conforming signals.

26. A method for providing automatic flight envelope protection as in claim 23 wherein:

the mission management system comprises the mission execution, navigation, guidance, and control systems.

27. A method for providing automatic flight envelope protection as in claim 23 wherein:

the flight envelope is dynamically calculated on-line to provide a continuum of values.

28. A method for providing automatic flight envelope protection as in claim 27 further comprising:

overriding the signal conforming step to enable an excursion from the flight envelope.

29. A method for providing automatic flight envelope protection as in claim 27 wherein:

the flight envelope is calculated using a bounded polytope approximation.

30. A method for providing automatic flight envelope protection as in claim 27 wherein:

state information is stored on existing memory of subsystems.

31. An apparatus for implementing the method specified in claim 23 comprising:

an aircraft sensing subsystem for continuously receiving input signals from sensors and mission management, guidance and navigation systems of an uninhabited air vehicle;

a calculator for calculating the input signals online to determine if they conform to operating limits of the vehicle;

a modifier for modifying all nonconforming signals to conforming signals, and;

a transmitter for transmitting conforming signals to a flight control system for execution.

32. An apparatus as in claim 31 wherein:

the operating limits of the vehicle are exceeded by overriding the modifier.

33. An apparatus as in claim 31 wherein:

state information is stored on existing memory of subsystems.

34. A system for automatic flight envelope protection for uninhabited air vehicles comprising:

means for dynamically calculating the flight envelope and mission on-line;

means for anticipating and detecting envelope exceedance logically interposed after the calculating means; and means for generating corrective actions to maintain the vehicle within the flight envelope and within the mission logically interposed after the anticipating and detecting means.

35. A system for providing automatic flight envelope protection as in claim 34 further comprising:

means for overriding the means of generating corrective actions to allow for envelope exceedance.

36. A system for providing automatic flight envelope protection as in claim 34 wherein:

the means for defining the flight envelope and mission, the means for anticipating and detecting envelope exceedance, and the means for generating corrective actions is interoperable with conventional aircraft guidance, navigation, control, propulsion, and avionic subsystems.

37. A system for providing automatic flight envelope protection as in claim 34 wherein:

the flight envelope is calculated from vehicle and earth-centered coordinates and vehicle avionic sensor inputs.

38. A system for providing automatic flight envelope protection as in claim 34 wherein:

the on-line calculation of the flight envelope uses stored parameter values to generate a continuum of possible changes to the flight envelope.

39. An apparatus as in claim 34 wherein:

the means for anticipating and detecting envelope exceedance is dynamically updated by the calculating means; and, the means for generating corrective action is dynamically updated by the anticipating and detecting means.

40. An apparatus as in claim 34 wherein:

the means for generating corrective action is dynamically updated by a bounding polytope method.

41. An apparatus as in claim 34 wherein:

the means for generating corrective actions utilizes virtual actuators and aerodynamic control effectors to allocate force to physical actuators.

42. An apparatus as in claim 34 wherein:

the means for calculating the flight envelope, the means for anticipating and detecting envelope exceedance, and the means for generating corrective action are logically interposed between a guidance and navigation system and a flight control system.

* * * * *